(12) United States Patent
Lamm

(10) Patent No.: US 7,939,209 B2
(45) Date of Patent: May 10, 2011

(54) METHOD FOR REGULATING THE EXHAUST TEMPERATURE OF A FUEL CELL SYSTEM

(75) Inventor: Arnold Lamm, Elchingen (DE)

(73) Assignee: Daimler AG, Stuttgart (DE)

( * ) Notice: Subject to any disclaimer, the term of this patent is extended or adjusted under 35 U.S.C. 154(b) by 1055 days.

(21) Appl. No.: 11/784,978

(22) Filed: Apr. 10, 2007

(65) Prior Publication Data

US 2009/0104491 A1    Apr. 23, 2009

(30) Foreign Application Priority Data

Apr. 12, 2006 (DE) .......................... 10 2006 017 646

(51) Int. Cl.
*H01M 8/04* (2006.01)

(52) U.S. Cl. ......... 429/413; 429/414; 429/433; 429/434

(58) Field of Classification Search .................. None
See application file for complete search history.

(56) References Cited

U.S. PATENT DOCUMENTS

| | | | |
|---|---|---|---|
| 5,401,589 A * | 3/1995 | Palmer et al. ................. | 429/408 |
| 6,656,620 B2 | 12/2003 | Katagiri et al. ................. | 429/26 |
| 7,651,799 B2 | 1/2010 | Guenther et al. ................. | 429/13 |
| 2002/0094469 A1* | 7/2002 | Yoshizumi et al. ............. | 429/34 |
| 2002/0146606 A1* | 10/2002 | Kobayashi et al. ............. | 429/24 |
| 2003/0189416 A1 | 10/2003 | Scholta et al. ................. | 320/101 |
| 2004/0258968 A1* | 12/2004 | Voss et al. ........................ | 429/26 |
| 2005/0037250 A1* | 2/2005 | Gunther ........................ | 429/26 |

FOREIGN PATENT DOCUMENTS

| | | |
|---|---|---|
| DE | 101 04 246 C1 | 6/2002 |
| DE | 10 2005 060396 | 6/2006 |

* cited by examiner

*Primary Examiner* — Robert Hodge
(74) *Attorney, Agent, or Firm* — Davidson, Davidson & Kappel, LLC

(57) ABSTRACT

A method for controlling the exhaust gas temperature of a fuel cell system, the fuel cell system including a fuel cell having an anode and a cathode, and further including a fuel supply line for supplying $H_2$-containing fuel to the anode, and an oxidant supply line for supplying $O_2$-containing gas to the cathode, and at least one discharge line for discharging anode gas and/or cathode gas from the fuel cell. The discharge line is connected by at least one humidifier with the fuel supply line and/or with the oxidant supply line in such a manner that the fuel and/or the oxidant is/are humidified with moisture from the exhaust gas. The exhaust gas temperature is controlled by changing the temperature of the fuel in the fuel supply line and/or that of the oxidant in the oxidant supply line, and by transferring heat in the humidifier from the fuel and/or the oxidant to the exhaust gas.

13 Claims, 1 Drawing Sheet

METHOD FOR REGULATING THE EXHAUST TEMPERATURE OF A FUEL CELL SYSTEM

This claims the benefit of German Patent Application DE 10 2006 017 646.4, filed Apr. 12, 2006 and hereby incorporated by reference herein.

The present invention relates to fuel cell systems with integrated fuel and/or oxidant humidification, and more specifically to a method for controlling the exhaust gas temperature of the fuel cell system so as to increase the temperature of the exhaust gas as compared to conventional designs.

BACKGROUND

Fuel cell systems with integrated humidification are known. Reference is made, for example, to German Patent DE 101 04 246 C1, which describes a fuel cell having two humidification units in which the process gas is humidified with the moisture contained in the exhaust gas, while heat is extracted from the exhaust gas streams by means of one heat exchanger, respectively, said heat being supplied to the process gas to evaporate the water contained therein.

U.S. Pat. No. 6,656,620 B2 also describes the transfer of a quantity of heat, especially from the exhaust gas to the process gas in a humidifier.

BRIEF SUMMARY OF THE INVENTION

As can be seen from the above-mentioned patents, practitioners in the art have endeavored to achieve the optimum temperature in the process gas (either fuel or oxidant) supplied to the fuel cell in known fuel cell systems. To this end, the exhaust gas has been used, and not only water but also heat has been extracted therefrom, as required. To date, little or no importance has been attached to the temperature changes in the exhaust gas resulting from the optimization of the process gas temperature, or to the absolute temperature of the exhaust gas.

However, the temperature of the exhaust gas governs the amount of moisture that can be absorbed by the exhaust gas (see, for example, the h, x diagram for moist air). If in a fuel-cell powered motor vehicle in which the inventive method may be used, the exhaust gas temperature is not controlled, this may result in uncontrollable or inadequately uncontrollable condensation of the exhaust gas moisture in the exhaust system of said motor vehicle.

An object of the present invention is to provide a method for controlling the exhaust gas temperature of a fuel cell system, in particular for a motor vehicle, whereby the condensation of exhaust gas moisture in a discharge line from the fuel cell can be reliably controlled and, in particular, completely or substantially prevented, thereby making it possible, in particular, to prevent water from being discharged in gushes from the exhaust pipe of the vehicle.

A fuel cell system for carrying out the method according to the present invention includes a fuel cell having an anode and a cathode, or a fuel cell stack having anodes and cathodes, and further includes a fuel supply line for supplying $H_2$-containing fuel to the anode, and an oxidant supply line for supplying $O_2$-containing gas to the cathode of the fuel cell. In the fuel cell, the known reactions then occur between the hydrogen of the fuel and the oxygen of the oxidant, generating an electrical voltage. The resulting reaction products are water and, for example, a $CO_2$-containing exhaust gas, depending on the fuel used.

Possible fuels include hydrogen, methane and methanol, but other hydrocarbons may also be used.

The exhaust gas may be removed from the fuel cell (or from the stack) through at least one discharge line, in particular through a first discharge line from the cathode and, as the case may be, a second discharge line from the anode, it being also possible to combine the exhaust gases from the cathode and the anode and discharge them through a common line. In systems operating with hydrogen, the removal of exhaust gas is typically limited to the cathode exhaust gas, because the hydrogen is returned to the anode inlet, for example, through a recycle loop, and is at least nearly completely consumed. In such designs, the exhaust gas can then be equated with the (cathode) exhaust air. In the process, the exhaust gas may be passed through one or more humidifiers, in particular through one humidifier for each exhaust line, for example, a first humidifier for the anode exhaust line and a second humidifier for the cathode exhaust line. The fuel and/or the oxidant may be passed through the same humidifier or humidifiers, respectively, so that the fuel and/or the oxidant is/are humidified with moisture from the exhaust gas. Such humidifiers can be constructed in a variety of ways known to those skilled in the art. For example, they can have at least one moisture-permeable membrane, one side of which is exposed to the exhaust gas, and the other, opposite side of which is exposed to the process gas, so that the gases are conducted to flow separately from each other, while still allowing the moisture to pass through the membrane from the exhaust gas to the process gas.

At the same time, in accordance with the present invention, heat may be transferred in the humidifier or humidifiers between the fuel and/or the oxidant and the exhaust gas. The direction of heat flow is from the fuel and/or the oxidant to the exhaust gas, and the temperature of the exhaust gas may be controlled by changing the temperature of the fuel in the fuel supply line and/or that of the oxidant in the oxidant supply line. Thus, the controlled variable is the exhaust gas temperature, and the controlling variable is the fuel temperature and/or the oxidant temperature.

In particular, the humidifier, which generally takes the form of a gas-to-gas humidifier, i.e., which is traversed by a gas—the fuel or the oxidant and the exhaust gas on the primary and secondary sides, respectively—may be used as the only heat exchanger for selectively transferring heat between the fuel and the exhaust gas or, respectively, between the oxidant and the exhaust gas. No additional heat exchanger is needed.

In some instances, the exhaust gas can be passed through an additional water separator, advantageously through a resonator with an integrated water separator, to separate water from the exhaust gas. Such a water separator may be used for controlled separation of water, for example, during cold-start phases and/or generally when starting from rest or driving away. The separator may include, for example, a container for the separated water and/or a loop for recycling the separated water into the washer fluid for cleaning windows and/or headlights of a vehicle.

By controlling the exhaust gas temperature in accordance with the present invention, in particular by increasing the exhaust gas temperature as compared to known designs, for example, to 70 degrees Celsius or higher, it is possible to minimize or completely prevent discharge of liquid at the outlet of the exhaust pipe, without having to provide additional components as compared to known systems, with the possible exception of a temperature sensor and a suitable control device for carrying out the control method according to the present invention. Advantageously, the gas-to-gas humidifier(s) that is/are already available can be used for heat exchange to raise the exhaust gas temperature.

BRIEF DESCRIPTION OF THE DRAWINGS

The present invention will now be illustrated with reference to an exemplary embodiment. The various components described may be provided, or dispensed with, individually or in groups, independently of the other components, unless explicitly stated otherwise.

In particular, FIG. 1 shows a fuel cell 1 including an anode 2 and a cathode 3. In order to generate a higher electrical voltage, fuel cell 1 can be equipped with a plurality of cells connected in series to form a stack.

DETAILED DESCRIPTION

Figure 1:
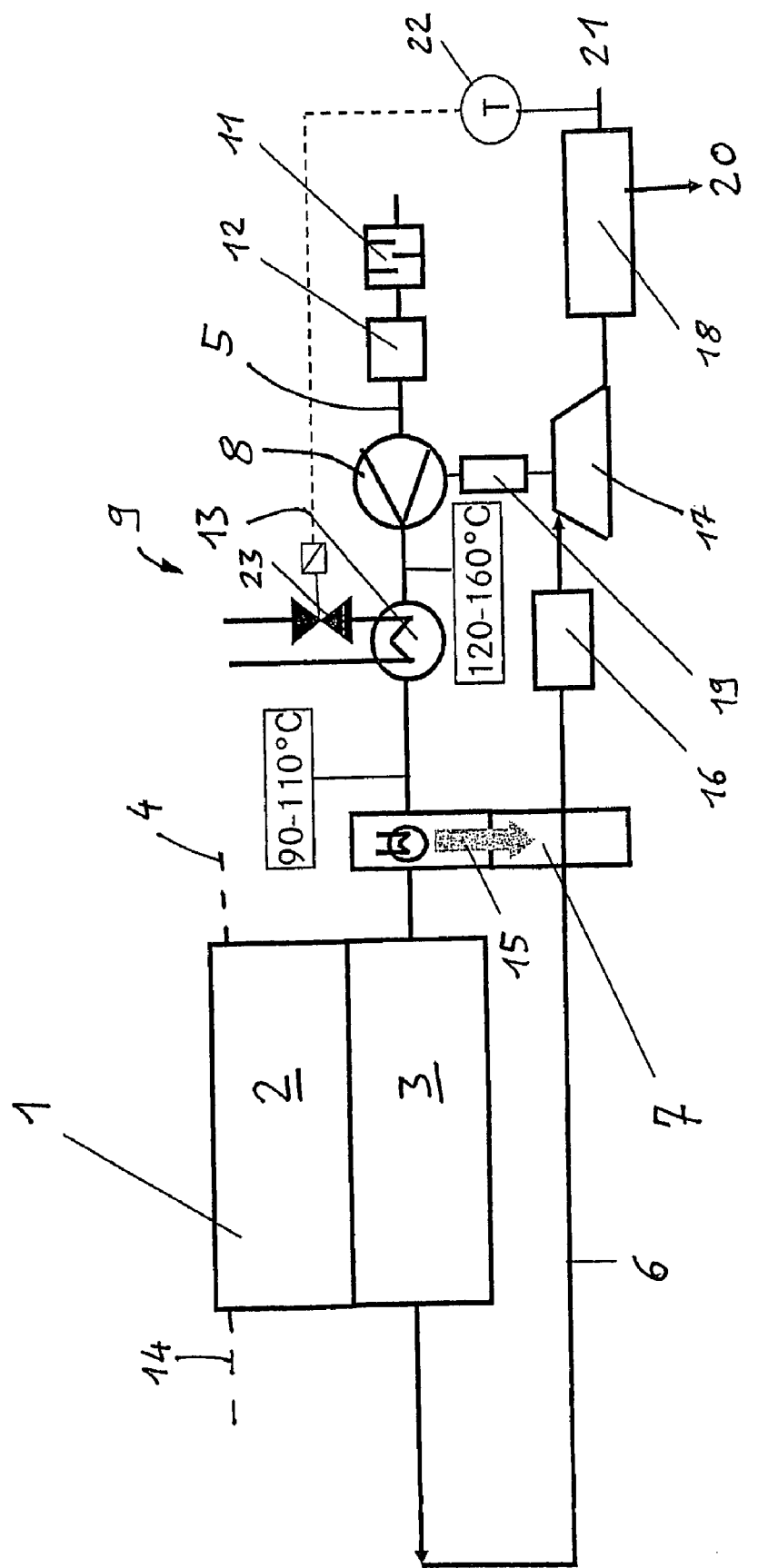
FIG. 1 is a schematic showing the path of the process gas and, respectively, of the exhaust gas, and further showing individual temperature points of a fuel cell system controlled in accordance with the present invention.

As can be seen, the method of the present invention is used here for controlling the temperature of the exhaust air, i.e., of the exhaust gas, from the cathode. Additionally or alternatively, the method could also be used for controlling the temperature of the exhaust gas from the anode, or the exhaust gases from the anode and the cathode could be combined, and the temperature of the exhaust gas mixture could be controlled in accordance with the present invention.

Fuel supply line 4 and exhaust line 14 for exhaust gas from the anode are shown only fragmentarily, because they are not used in the embodiment shown in FIG. 1 for controlling the exhaust gas temperature.

Oxidant supply line 5 feeds into cathode 3 to supply $O_2$-containing gas to cathode 3, the oxidant used in this case being air, and the oxidant supply line having disposed therein in series, starting at an air inlet, an air filter 11, a sonic silencer 12, a compressor 8, an intercooler 13, and a humidifier 7, as viewed in the direction of flow. The temperature of the charge air (or, more generally, of the oxidant) is raised in compressor 8, for example, to between 120 to 160 degrees Celsius, as illustrated. In the downstream intercooler 13, the air is cooled down, for example, to between 90 to 100 degrees Celsius or, as illustrated, to between 90 to 110 degrees Celsius.

The illustrated intercooler 13, together with its cooling-water circuit (or, more generally, its coolant circuit, so as not to limit it to water as the cooling medium), is only one possible example of a cooling device 9 for cooling the entire oxidant stream in oxidant supply line 5, it being possible for said cooling-water circuit to be, for example, a branch line of the vehicle's cooling circuit, in particular of a high-temperature cooling-water circuit. Alternatively, it would also be possible to pass only part of the oxidant of oxidant supply line 5 through a cooling device and, in addition, to provide the cooling device with a bypass through which is passed the remaining oxidant of oxidant supply line 5, which is not intended to be cooled by the cooling device. The desired oxidant temperature upon combination of the oxidant from the cooling device with the oxidant from the bypass can be adjusted by suitably dividing the oxidant streams to the cooling device and through the bypass around the cooling device, for example, by means of a controllable 3/2-way directional control valve, or the like. This also encompasses the two limiting cases where all or nothing of the oxidant is passed through the cooling device.

To allow temperatures in the range from 100 to 110 degrees Celsius or higher to be reached in the downstream humidifier 7 without the risk of damage to humidifier 7, said humidifier 7 can advantageously be provided with polymer fibers having adequate resistance to temperature.

At the outlet of humidifier 7, i.e., in the region of the air inlet to cathode 3, the temperature can then be approximately or exactly 90 degrees Celsius.

The relatively high temperature level at the oxidant inlet to humidifier 7 leads to a relatively high heat flow 15 from the oxidant (the supply air to cathode 3) to the exhaust gas in discharge line 6 from cathode 3, whereby the exhaust gas in discharge line 6 is heated correspondingly.

In particular, the exhaust gas flows from cathode 3 directly to humidifier 7, passes therethrough, absorbing the above-mentioned quantity of heat, and further through an exhaust gas catalytic converter 16, an expansion engine, in particular in the form of the illustrated turbine 17, and through an exhaust system 18.

The exhaust gas can be heated further in exhaust gas catalytic converter 16.

Turbine 17 drives, for example, compressor 8. For this purpose, turbine 17 is connected to compressor 8, in particular by a common shaft.

Additionally or alternatively, turbine 17 can drive an electric generator 19, which supplies electrical power, for example, to an electric motor for driving compressor 8. However, it is also possible to provide only one electric machine for driving compressor 8, said electric machine driving compressor 8 always when turbine 17 does not deliver enough driving power, while also being capable of operating as an electric generator when turbine 17 is driving this electric machine, in particular in addition to driving compressor 8.

Exhaust system 18 may include or consist of, for example, a pipe and a resonator with integrated water separation. Water separation can be accomplished by atomization, heating, or the like. The water is discharged through water outlet 20, while the exhaust gas, or the exhaust air, exits from outlet 21 without any water in the liquid phase.

As illustrated, a temperature sensor 22 may be provided at outlet 21 of discharge line 6, said temperature sensor measuring the temperature of the exhaust gas at outlet 21. A control device (not shown) of the fuel cell system can adjust the oxidant temperature at the inlet of humidifier 7 according to said temperature measurement, the adjustment being made, for example, as illustrated by suitably opening and/or closing a control valve 23 in a coolant circuit, such as a cooling-water circuit, which cools the oxidant in intercooler 13. Increasing opening of control valve 23 will increase the coolant flow, which results in increased cooling of the oxidant in intercooler 13, while increasing closing of control valve 23 will reduce the coolant flow, so that the cooling of the oxidant in intercooler 13 is reduced correspondingly. Particularly advantageously, control valve 23, which is initially in a predetermined opening position, or fully open, is closed incrementally or continuously until the temperature of the exhaust gas in discharge line 6 measured at outlet 21 reaches or exceeds 70 degrees Celsius.

If, in spite of completely closing control valve 23, the desired temperature at outlet 21 cannot be reached, the exhaust gas temperature can be increased by additional measures, such as activating a heater, or by increasing the heating power in exhaust system 18.

In a special embodiment of the control method, a distinction can be made between a winter mode and a summer mode, the temperature of the exhaust gas and/or of the process gas (in this case of the oxidant) being adjusted to a higher value in the winter mode. An outside temperature sensor measuring the outside temperature may be provided to decide whether the winter mode or the summer mode is appropriate at a given time. Alternatively, it is also possible to switch manually or automatically between winter mode and summer mode based on a date. Manual switching is understood herein to also include programming or setting of a default value in a provided control system and/or operation of a switch, or the like.

In the winter mode, the temperature of the coolant in intercooler 13 can, for example, be increased compared to the summer mode, for example, by exactly or approximately 5 degrees Celsius. In particular, the temperature of the coolant is 70 degrees Celsius in winter and 65 degrees Celsius in the summer mode. Additionally or alternatively, the control of the mass flow in the coolant circuit can be changed by control valve 23 in the winter mode compared to the summer mode, said change being accomplished by passing less coolant to intercooler 13 in the winter mode than in summer.

In the winter mode, the temperature of the exhaust gas at the cathode outlet can be adjusted to, for example, 75 degrees Celsius, while in the summer mode, a temperature of 70 degrees Celsius is adjusted at this point.

As used in the claims, the term "or" is not an exclusive "or" but rather can encompass "and/or."

What is claimed is:

1. A method for controlling the exhaust gas temperature of a fuel cell system, the fuel cell system including a fuel cell having an anode, a cathode, the fuel cell system further including a fuel supply line for supplying $H_2$-containing fuel to the anode, an oxidant supply line for supplying $O_2$-containing gas to the cathode, and at least one discharge line for discharging anode gas or cathode gas from the fuel cell, the discharge line being connected by at least one humidifier with the fuel supply line or with the oxidant supply line so that the fuel or the oxidant is humidified with moisture from the exhaust gas, the method comprising the step of:

controlling a temperature of the exhaust gas by changing a fuel temperature of the fuel in the fuel supply line or an oxidant temperature of the oxidant in the oxidant supply line, and by transferring heat in the humidifier from the fuel or the oxidant to the exhaust gas, the controlling including cooling the oxidant in the oxidant supply line with a cooling device and a cooling circuit including a control valve by controlling the amount of coolant passing through the cooling device by increasing opening of the control valve or increasing closing of the control valve to adjust the heat transfer in the humidifier from the fuel or the oxidant to the exhaust gas and control the temperature of the exhaust gas.

2. The method as recited in claim 1 wherein the transfer of heat in the at least one humidifier is the only controlled transfer of heat between the fuel or the oxidant and the exhaust gas.

3. The method as recited in claim 1 wherein the cooling occurs after the oxidant has been compressed in a compressor.

4. The method as recited in claim 1 further comprising measuring the temperature of the exhaust gas in the discharge line, the fuel temperature of the fuel or oxidant temperature being changed as a function of the measured temperature of the exhaust gas.

5. The method as recited in claim 4 wherein the temperature of the exhaust gas is measured directly by temperature sensor.

6. The method as recited in claim 4 wherein the temperature is measured at an outlet of the discharge line.

7. The method as recited in claim 1 further comprising passing the exhaust gas through a water separator in the discharge line at a position upstream or downstream of the humidifier as viewed in a flow direction of the exhaust gas.

8. The method as recited in claim 7 wherein the water separator is integrated in a resonator.

9. The method as recited in claim 1 wherein the humidifier is a gas-to-gas humidifier.

10. The method as recited in claim 1 wherein the temperature of the oxidant at the inlet to the humidifier is increased by reducing the cooling until the temperature of the exhaust gas in the discharge line rises to 70 degrees Celsius or higher.

11. The method as recited in claim 10 wherein the temperature of the exhaust gas in the discharge line is determined at an outlet end.

12. The method as recited in claim 1 wherein the controlling step includes two operating states: a winter mode and a summer mode; and in the winter mode, the exhaust gas temperature is adjusted to a higher value than in the summer mode.

13. The method as recited in claim 1 further comprising effecting a further increase in the exhaust gas temperature using an exhaust gas catalytic converter.

\* \* \* \* \*